United States Patent [19]

Brown

[11] Patent Number: 5,054,879
[45] Date of Patent: Oct. 8, 1991

[54] PUSH/PULL FIBER OPTIC CONNECTOR

[75] Inventor: Vincent B. Brown, Prospect Heights, Ill.

[73] Assignee: Mthode Electronics, Inc., Chicago, Ill.

[21] Appl. No.: 506,296

[22] Filed: Apr. 9, 1990

[51] Int. Cl.[5] .............................................. G02G 6/38
[52] U.S. Cl. ........................................ 385/59; 385/78
[58] Field of Search ................. 350/96.2, 96.21, 96.22

[56] References Cited

U.S. PATENT DOCUMENTS

| 4,178,068 | 12/1979 | Hoover | 350/96.22 X |
|---|---|---|---|
| 4,541,685 | 9/1985 | Anderson | 350/96.21 |
| 4,693,550 | 9/1987 | Brown et al. | 350/96.20 |
| 4,707,068 | 11/1987 | Moulin | 350/96.21 |
| 4,789,218 | 12/1988 | Paul et al. | 350/96.21 |
| 4,850,670 | 7/1989 | Mathis et al. | 350/96.21 |
| 4,884,861 | 12/1989 | Nodfelt | 350/96.21 X |
| 4,892,379 | 1/1990 | Takeda et al. | 350/96.21 |

Primary Examiner—John D. Lee
Assistant Examiner—John Ngo
Attorney, Agent, or Firm—Allegretti & Witcoff, Ltd.

[57] ABSTRACT

A fiber optic connector assembly for terminating and connecting fiber optic cables. The assembly comprises a housing, which housing comprises a pair of separable portions which may be locked together, with each of the housings carrying a plurality of fiber optic connector halves. The fiber optic connector halves, when connected, comprise a pair of ferrules, each having a bore proportioned to receive the stripped end of one of the cables having an exposed fiber optic core end. The ferrules have outer walls that are parallel to the axis of the bore. An outer sleeve is present defining a tubular portion for snug contact with the ferrule outer walls while the ferrules are in end-abutting relation. The relative transverse positioning of the ferrules in an abutting relation is determined by the position and shape of the tubular portion and its engagement with the ferrule outer walls. Thus, fiber optic core ends within the abutting ferrules may abut each other with precisely controlled transverse alignment.

5 Claims, 2 Drawing Sheets

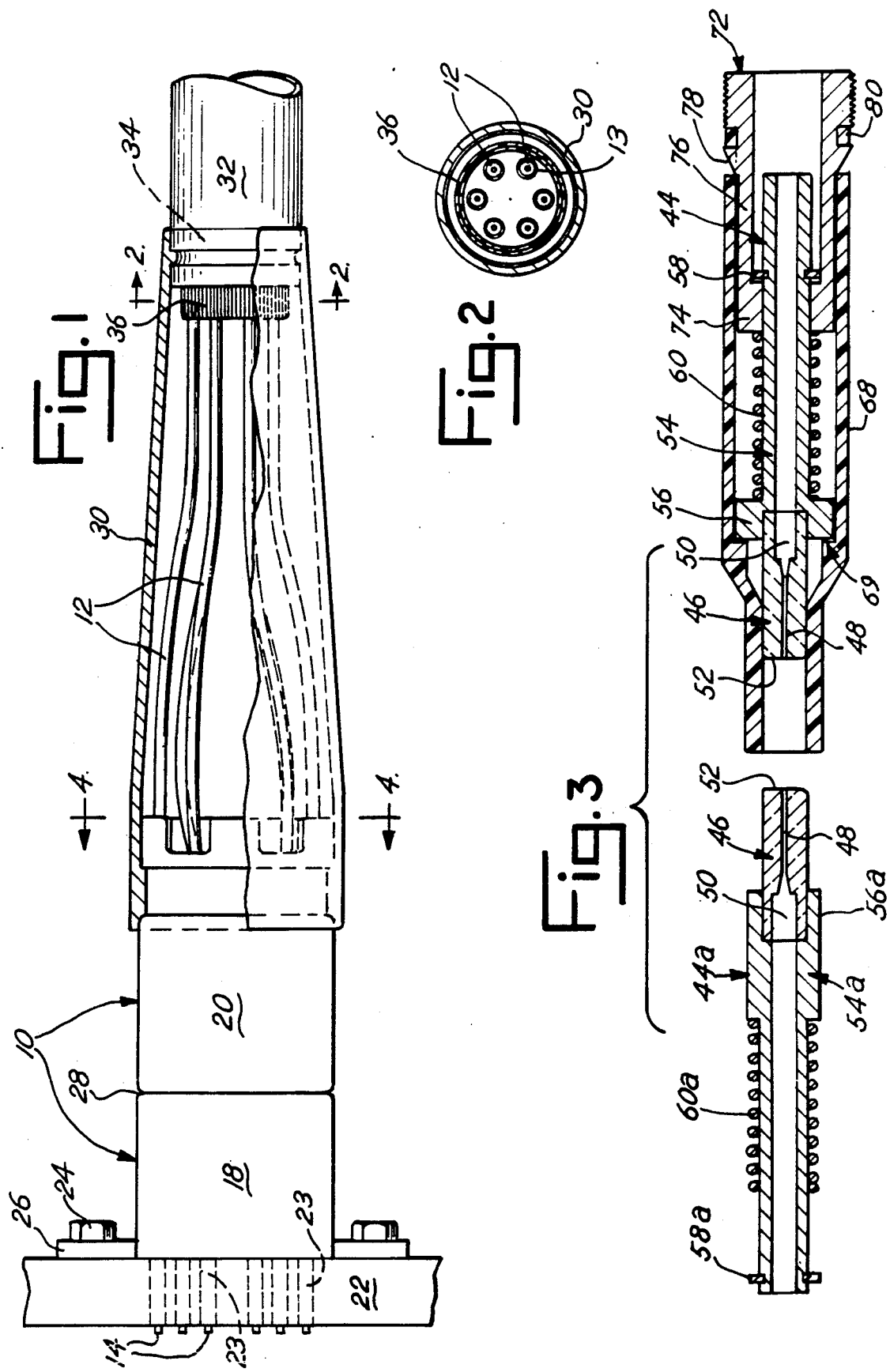

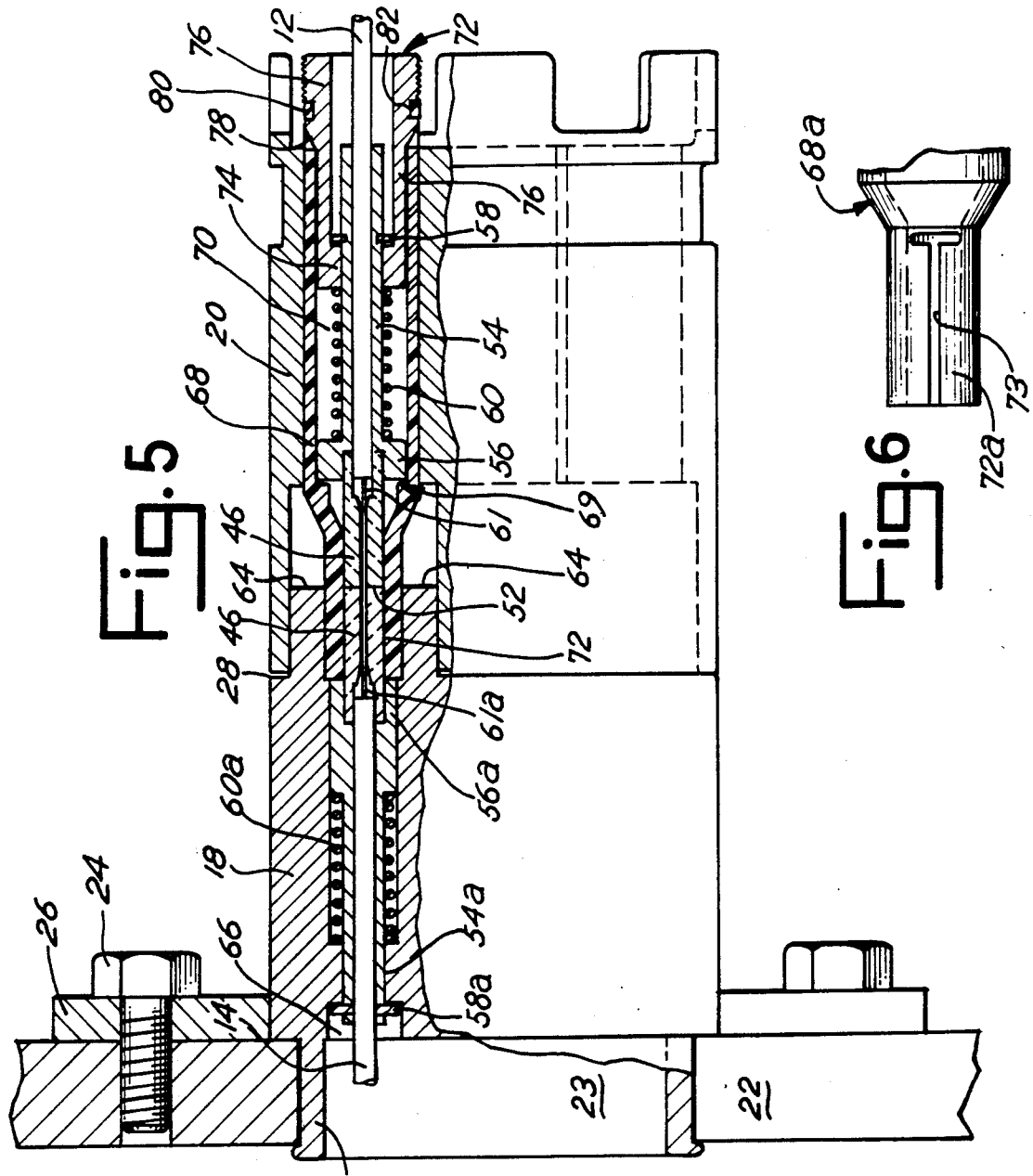
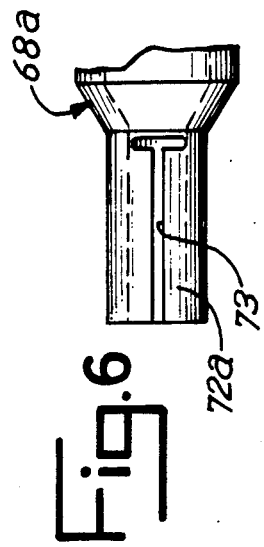
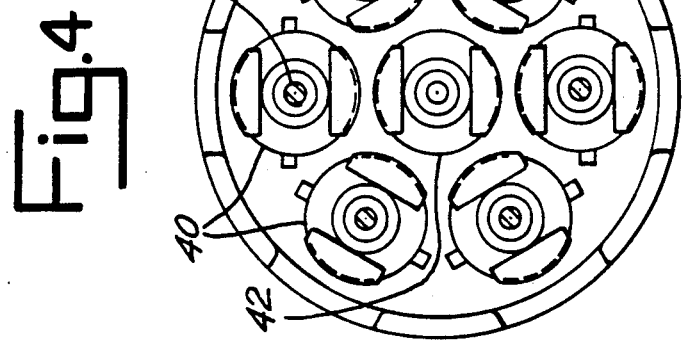

PUSH/PULL FIBER OPTIC CONNECTOR

Fiber optic cable systems require connectors that hold separate fiber optic cables together with their ends in pressurized abutting relation, such as Brown et al. U.S. Pat. No. 4,693,550 and Brown U.S. Pat. No. 4,789,218. Additionally, it is important for the abutting multi fiber fiber optic cables to be held in substantially coaxial relation, to minimize the attenuation of light signals that pass through the interface of the abutting cables.

This desirably should b accomplished with fiber optic connectors that occupy a minimum of space, to permit size reduction of fiber optic cable-using systems. At the same time, the connection and disconnection between the fiber optic cables should be easy, for repair and redesign of the system.

The fiber optic connector of this invention provides the above advantages, and may be used in computers, communication systems, or any other desired use where fiber optic cables are to be connected.

DESCRIPTION OF THE INVENTION

This invention relates to a fiber optic connector for terminating and connecting a pair of multi fiber fiber optic cables. Each fiber within the cables are covered by insulation, typically inner cladding surrounded by an outer insulation.

By this invention, the fiber optic connector comprises a pair of ferrules, each having a bore proportioned to receive the stripped end of one of the cables having an exposed fiber optic core end. The ferrules have outer walls that are parallel to the axis of the bore. An outer sleeve, split or solid, defines a tubular portion for snug contact with the ferrule outer walls while the ferrules are in end-abutting relation, with the result that the relative transverse positioning of the ferrules in end-abutting re ation is determined by the position and shape of the tubular portion and its engagement with the ferrule outer walls.

Accordingly, fiber optic core ends which are inserted into the abutting ferrules may also abut each other with precisely controlled transverse alignment. In preferred embodiments of this invention, the abutting fiber optic core ends, which are preferably adhered within the abutting ferrules by either adhesive or by crimping, may be transversely aligned with each other with an accuracy to permit a signal loss through the connector of no more than one decibel. Such a low signal loss can be accomplished by alignments of the abutting optic fiber ends that have an error of typically no more that 40 millionths of an inch.

Preferably, each of the ferrules is made of a precisely molded, non metallic material such as glass, ceramic or plastic, with the optic fibers within the ferrules being bonded thereto by an adhesive such as thermoset epoxy resin. Each ferrule is preferably connected by adhesive or crimping at an end opposed to the end which abuts the other ferrule, to a tubular metal sleeve for receiving a length of optic cable which is spaced from the stripped cable end.

Also, each tubular metal sleeve may define a locking flange, which is preferably removable, being provided, for example, by a C ring retainer which slides transversely in a slot defined by the tubular metal sleeve. The tubular metal sleeves and ferrules may be carried within connectable housing portions. Means are then provided for engaging the locking flanges to limit longitudinal forward motion of the tubular sleeves and bonded ferrules relative to the housing portions. This provides part of the lock of the fiber optic connector in the connected housing for securance thereof.

It is also preferred for a flexible locking member to be positioned to inwardly abut one of the locking flanges, having the function, as stated above, of limiting forward movement of the locking flange and the tubular sleeve which carries it. The flexible locking member also defines locking means which are removably engageable with one of the housing portions, as part of the locking retention system for the fiber optic connector within the housing. The locking means may comprise a pair of flexible arms which interact through the use of a tab and slot type system with the housing, so that when the tab and slot are engaged, the locking member is locked in place. However, the locking member may be disengaged and removed by the pinching together of the flexible arms either manually or through the use of a simple tool.

Thus, while the fiber optic connector of this invention can be solidly locked within connected and locked housing halves, it may be disengaged from the housing halves by disengagement of the flexible locking member, followed by separation of the associated fiber optic connector half.

It is additionally preferred for resilient means to be provided within the system to press the end-abutting ferrules and fiber optic cor ends in the ferrules together with a predetermined force, for example about four pounds of overall force for a connector system which comprises six fiber optic connectors. Additionally, the resilient means typically urges the flexible locking member away from the abutting ferrules and against the locking flange that it inwardly abuts.

The fiber optic connector of this invention typically is carried in a fiber optic connector assembly which comprises a housing, which housing carries a plurality of the fiber optic connectors described herein.

Typically, the housing carries, as stated above, a plurality of the fiber optic connectors which have been described above, each in a receptacle or aperture. While a plurality of these fiber optic connectors may carry abutting fiber optic cores of stripped cable ends to provide actual fiber optic connection, it is preferred although not necessary for at least one of the fiber optic connectors to be present as a spare unit which is free of carried cable ends. Thus, in the event of an optic cable failure, there is room for another cable connection to be made through the spare unit.

The fiber optic connector assembly has the significant advantage of small size. In preferred embodiments it is possible for the diameter of the assembly to be no more than ¾ inch, while the housing contains a circular array of at least six of the fiber optic connectors of this invention.

Also, it is preferred for the housing to be attached at one end to a printed circuit board, which may be part of an electronic computer system or the like. The board, in turn, defines aperture means, with one of the multi fiber fiber optic cables extending through the aperture into communication with the connector. A plurality of fiber optic pig tails and/or jumper cables also can be employed if desired, depending on the application.

DESCRIPTION OF DRAWINGS

In the drawings, FIG. 1 is an elevational view of a fiber optic connector assembly of this invention, with portions broken away;

FIG. 2 is a sectional view taken along line 2—2 of FIG. 1;

FIG. 3 is a longitudinal sectional view of a fiber optic connector of a type which may be carried in the assembly of FIG. 1., with the respective abutting ferrules shown in separated configuration prior to assembly;

FIG. 4 is a sectional view taken along line 4—4 of FIG. 1, with the outer flexible boot omitted;

FIG. 5 is an enlarged elevational view of a portion of the fiber optic connector assembly of FIG. 1, with portions thereof shown in section; and FIG. 6 is a fragmentary, elevational view of the front end of another embodiment of plastic plug housing used herein.

DESCRIPTION OF SPECIFIC EMBODIMENTS

Referring to the drawings, a fiber optic connector assembly 10 is shown for connecting a group of fiber optic cables 12 with mating cables 14, with the respective optic cables 12, 14 mating together in precisely aligned, end abutting relation to avoid attenuation of light signals passing through the respective cables as they traverse the junction between the abutting cables 12, 14. The respective cables are conventionally enclosed in sheaths 13.

Connector assembly 10 comprises a housing for the connected cable ends, which housing comprises a pair of separable and conventionally lockable components 18, 20, each of which components retains the ends of a respective set of cables 12, 14. Furthermore, as shown, housing component 18 may be attached to a printed circuit board 22 of a computer system or the like, or it may be attached to any other supporting structure, by means of bolts 24 which extend through flanges 26, which flanges are attached to housing component 18. Also it can be attached by snap-in or bonding means such as molded flange 16 of lockable component 18 (FIG. 5) which flange may be conventionally locked into aperture 23 of printed circuit board 22. Cables 14 extend through aperture 23 in printed circuit board 22 into engagement with housing component 18.

Cables 12 extend rearwardly from the abutting junction 28 between housing components 18, 20, being sheathed by a flexible, tubular boot 30, which extends between housing component 20 and outer sheath 32 of a multiple unit cable assembly, which comprises all of the individual optic cables 12, being held in place by an apertured strain relief nut 34 which is carried about outer cable jacket 32.

As is conventional, an inner Kevlar brand jacket 36 which surrounds cables 12 may be folded rearwardly in a telescoping manner so that a double layer of the tubular Kevlar jacket is provided. An adhesive resin such as epoxy resin is applied to the outer surface of the Kevlar jacket, and nut 34 is brought up so that its inner surface bonds to the adhesive-treated outer surface of the folded, tubular Kevlar jacket. By this means, good strain relief is provided to the optic cables 12, which can be seen to be relatively loosely disposed while flexible boot 30 is stretched to its maximum length.

Fiber optic connector assembly 10 exhibits significant advantages over fiber optic connectors of the prior art in that the respective housing portions 18, 20 can provide quick release push/pull action after unlocking, to connect or disconnect each terminated optic fiber with direct push/pull action at the respective ends of cables 12, 14 which are within housing portion 20.

FIG. 4 shows an end view of housing portion 20 in which six terminated optic cables 12 are shown to be mounted in a circular array in corresponding receptacles or apertures 40 of housing portion 20. Normally, a central aperture 42 carries a connector portion which is free of attached optic cable, to make room for another cable connection in the event of a failure of any of the existing cable connections. Thus, in-the-field repairs can be easily made in the event of a failure of an optic cable connection, as indicated by a significant loss of signal across the abutting cable ends. Housing portion 18 is of similar design, so that the six cables 14 are also received in their own apertures analogous to apertures 40, and a spare, central aperture analogous to aperture 42 is provided to permit an added optic cable connection should such be required.

FIG. 3 shows the two halves 44, 44a of an individual fiber optic connector which is used to terminate the respective ends of fiber optic cables 12, 14 for installation into housing portions 18, 20. Each connector half 44, 44a comprises a tubular ferrule 46, which may be made of glass, ceramic or plastic, and is constructed to very precise tolerance to facilitate the desired close, coaxial alignment of the respective, abutting ends of optic cables 12, 14. Each of ferrules 46 defines a bore 48 which typically has a diameter directly related to the diameter of the fiber to be terminated, usually about 0.005 inch along its narrow section as shown, with bore 48 also defining an enlarged bore section 50. Ferrules 46 define abutting ends 52 which, as shown in FIG. 5, abut together in the connected position.

At the respective ends of ferrules 46 which are opposed to abutting ends 52, the respective ferrules may be attached by epoxy adhesive or the like to a tubular aluminum sleeve 54, 54a, which sleeves can be seen to be of similar structure but of somewhat different design, as shown. Both of the sleeves define a forward flange 56, 56a and a rear slot which receives a C ring retainer 58, 58a, which serves as a removable flange as part of the retention means of the connector system. Also, both of tubular sleeves 54, 54a carry a coil spring 60, 60a as shown, with one end of each spring being retained by a flange 56 or 56a.

As an initial step for connection of the respective fiber optic cables 12, 14, the respective optic cable ends are stripped of their insulation (optionally leaving the cladding in place about the actual, optic fiber), and the resulting stripped optic fibers 61, 61a (FIG. 5) are inserted into the respective bores 48 of ferrules 46, while sections of the respective optic cables 12, 14 which are spaced from the optic fiber ends 52 occupy the bores of respective tubular sleeves 54, 54a. Fiber optic cables 12, 14 may be retained within their respective ferrules 46 and sleeves 54, 54a by means of an adhesive, for example a thermoset epoxy resin or the like.

Then, when the respective terminated cables 12, 14 are to be connected, housing portion 18 is typically attached to circuit board 22 or another structural member, and optic cables 14, terminated with members 46, 54a, are inserted through the end 64 of housing component 18, rearwardly through the outer end 64 and toward PC board 22, after optic fiber 61a has been secured, cleaved, and polished at the abutting end 52 in conventional manner. Fiber end cleaving and polishing is typically accomplished prior to their assembly into housings 18 and 20.

Alternatively, the joined ferrule 46 and sleeve 54a may be inserted into housing portion 18 prior to insertion of the optic cables 14, with cables 14 being inserted therein through apertures 23, and then extended out again for cleaving and polishing.

Then, attached members, 46, 54a may be pushed to the left as seen in FIG. 5, compressing spring 60a, until C ring retainer 58a may be installed through open aperture 66, to lock connector portion 46, 54a into a position where spring 60a is under tension. This provides a resilient means to press the respective ferrules 46 together with a predetermined force in use. Typically, the overall predetermined pressure of the six fiber optic connectors in housing portions 18, 20 against each other is about four pounds.

The respective fiber optic cables 12 are terminated with a connector portion comprising sleeve 54 and the attached ferrule 46. Each of the optic cables 12 are stripped and installed in connector portion 54, 46, with the stripped optic fiber portion 61 being cleaved and polished at its abutting face 52. As with optic cables 14, cables 12 are also secured to sleeve 54 and the attached ferrule 46 by means of an adhesive such as epoxy resin. However, as an alternative in the cases of both cables 12 and 14, they may be crimped into position with their respective sleeves 54, 54a, if desired.

Plastic plug housing 68 is positioned within each of apertures 40 of housing portion 20, as shown. Each plug housing 20 defines a bore which has an enlarged portion 70, and a precisely configured, reduced-size bore portion 72 which encloses ferrules 46 and their abutting ends 52. Thus, alignment plug housing 68 serves as an outer sleeve defining a tubular portion 72 for snug contact with the ferrule outer walls while the ferrules are in end-abutting relation. By this means, the relative transverse positioning of the ferrules 46 in end-abutting relation is determined by the bore portion 72 and its engagement with the ferrule outer walls. Thus, the optic fiber ends within the abutting ferrules may also abut each other, with precisely controlled transverse alignment. Specifically, the transverse alignment may be sufficiently accurate and coaxial to permit a signal loss through the connector and across the junction at abutting faces 52 of no more than one half decibel.

As an alternate embodiment shown in FIG. 6, plug housing 68 and especially bore portion 72a may carry a longitudinal slit and be slightly undersized, to resiliently, radially compress, center, and retain ferrules 46 with transverse spring pressure. Bore portion 72a may naturally have a slight elliptical shape, which becomes stressed into round shape when both ferrules 46 are inserted in abutting relation as in FIG. 5, to provide a dynamic, floating alignment action to the ferrules 46. Apart from this, bore portion 72a may be essentially identical to bore portion 72 in its structure and function.

The structure of this invention provides significant advantages in terms of low loss of signal strength because of the accurate alignment of the optic fibers that is possible in this connector assembly which comprises a plurality of fiber optic connectors 10. One reason for this is that the use of the alignment plug housing 68 in conjunction with ferrules 46 is capable of high alignment accuracy, because the relatively small parts used may be manufactured with much higher tolerance when compared with a multiple cable connector which is a one-piece molding. A larger, one-piece housing having multiple apertures for optic cables will necessarily lack the capability for the high tolerances that can be achieved with the structure of this invention, in which the respective cable ends are separately joined together as shown.

Tubular sleeve 54 and its attached ferrule 46 may be locked in position within plug housing 68, along with the stripped cable 12 carried therein, by first threading the apertured ring portion 74 of locking member 72 in telescoping relation about tubular sleeve 54. Locking member 72 may then be advanced to compress coil spring 60, which is also threaded about sleeve 54, with coil spring 60 being thus compressed between flange 56 and apertured ring 74. When apertured ring 74 has passed the appropriate receiving slot in tubular sleeve 54, C-ring retainer 58 may be inserted, to act as a holding flange to keep spring 60 and locking member 72 in a spring-compressed position, with locking member 72 being thus locked in a slidable retention with tubular sleeve 54.

Then, locking sleeve 54 and the other attached parts may be inserted into plug housing 68 as shown, to bring the abutting ends of stripped optic fibers 61, 61a into their abutting relation under spring-biased tension as provided by springs 60, 60a. Flange 56 is inwardly positioned by abutment against shoulder 69 of plug housing 68. Thus, vibration and the like of the system will be much less likely to cause momentary separation of the abutting junction between the respective ends of fibers 61, 61a.

Locking member 72 carries a pair of arms 76 that are attached to apertured ring 74 in diametrically opposed relation to each other, and which extend rearwardly as shown, away from abutting ferrule ends 52. These arms 76 serve as spring retention arms, each defining a ramp 78 that causes each arm to be depressed inwardly as it engages side tab 80 of plug housing 68, as tubular sleeve 54 and the attached parts are advanced into plug housing 68. Hence, spring arms 76 are thus deflected inwardly, and then snapped back into locking relation with side tabs 80 by means of the engagement of side tabs 80 into recesses 82 of the respective arms, to lock tubular sleeve 54 and the associated parts with plug housing 68.

When it is desired to disassemble an individual connector (as shown in FIG. 5), one may manually grasp and press arms 76 inwardly to cause disengagement between tabs 80 and recesses 82. Then, sleeve 54, attached to locking member 72 and with the attached ferrule 46 and optic cable 12, may be withdrawn for disassembly. Upon removal of C-ring retainer 58a, tubular sleeve 54a may also be removed by pulling it to the right as shown in FIG. 5, after removal of plug housing 68, so that the entire system may be dissembled. This may be done after separation of the respective housing components 18, 20, and represents a simple way to make temporary disconnection and subsequent connection.

The connector of this invention exhibits significant advantages over connectors of the prior art. The connector assembly of this invention can provide a precise push-pull connection between the ends of individual optic cables 12, 14 by their simple separation or connection in which the respective optic fibers 61, 61a abut together in a highly coaxial manner for a low signal loss. This push-pull connection may be made between individual cables 12, 14 and their respective housing parts 18, 20, and also between the housing ports 18, 20 and their mounted cables 12, 14.

Furthermore, the connector assembly of this invention is susceptible to miniaturization, so that more optic cables may be connected in a smaller transverse area. Specifically, housing portions 18, 20 may have a diameter of approximately ⅝ inch and preferably no more than ¾ inch, even though at least six of the connectors of this invention are present. Additionally, a spare aperture 42 is provided for the use of another connector should that be required, particularly in the event of a breakdown or the like of the connectors originally present.

The connectors of this invention are resiliently connected so that vibrations do not cause transient separation of the abutting junction 52 between fiber optic core ends 61, 61a. The use of nonmetallic ferrules 46 permits the molding of such structures with high accuracy which, in conjunction with sleeve 68, provides the great alignment accuracy.

The presence of the tweezer-type locking member 72 provides easy manual disassembly of the connectors of this invention. Additionally, the invention permits the extensive use of molded plastic, which results in an overall material cost reduction over fabricated metal parts.

The above has been offered for illustrative purposes only, and is not intended to limit the scope of the invention of this application, which is as defined in the claims below.

That which is claimed is:

1. A fiber optic connector for terminating and connecting at least a pair of fiber optic cables, said cables each having a central fiber optic core covered by insulation, said fiber optic connector comprising:

a pair of ferrules, each having a bore proportioned to received the stripped end of one of said cables having an exposed fiber optic core, said ferrules having outer walls that are parallel to the axis of said bore, an outer sleeve defining a tubular portion for snug contact with said ferrule outer walls while the ferrules are in end-abutting relation, the relative transverse positioning of said ferrules in end-abutting relation being determined by the position and shape of said tubular portion and its engagement with said ferrule outer walls, whereby fiber optic core ends within said abutting ferrules may also abut each other with precisely controlled transverse alignment, each ferrule being of molded, nonmetallic construction and connected at an end opposed to said ferrule abutting end to a tubular metal sleeve for receiving a length of optic cable spaced from the stripped cable end, each tubular metal sleeve defining a locking flange, said sleeves being carried within connectable housing portions, and means for engaging said locking flanges to limit longitudinal forward motion of said tubular sleeves and connected ferrules relative to said housing portions, and a flexible locking member positioned to inwardly abut one of said locking flanges to limit forward movement of said locking flange, said locking member comprising a pair of flexible arms removably engagable with one of said housing portions, whereby said fiber optic connector is carried with locking retention with said housing.

2. The fiber optic connector of claim 1 in which resilient means are provided to press said end-abutting ferrules and fiber optic core ends in the ferrules together with a predetermined force, and also to urge said flexible locking member away from the abutting ferrules.

3. A fiber optic connector assembly for terminating and connecting a plurality of fiber optic cables, said connector assembly comprising a housing, said housing carrying a plurality of apertures which in turn carry a plurality of separate fiber optic connectors, said connectors carrying abutting fiber optic cores of stripped cable ends, said fiber optic connectors each comprising a pair of ferrules, each having a bore proportioned to receive the stripped end of one of said cables having an exposed fiber optic core end, an outer sleeve defining a tubular portion which is in snug contact with the outer walls of said ferrules while the ferrules are in end-abutting relation, the relative transverse positioning of said ferrules in end-abutting relating being determined by the position and shape of said outer sleeve means and ferrule outer walls, whereby fiber optic core ends within said abutting ferrules may also abut each other with precisely controlled transverse alignment, each ferrule of the carried fiber optic connectors is of molded, non-metallic contruction and is connected at an end opposed to said ferrule-abutting end to a tubular metal sleeve for receiving a length of optic cable spaced from the stripped cable end, each tubular metal sleeve defining a removable locking flange, said sleeves being carried within connectable portions of said housing, and means for engaging said locking flanges to limit longitudinal forward motion of said tubular sleeves and bonded ferrules relative to said housing portions, and a flexible locking member positioned to inwardly abut one of said locking flanges in each of said connectors to prevent forward movement of said locking flange, said locking member defining locking means comprising a pair of flexible arms, said arms being removable engagable with one of said housing portions in which each of said connectors is carried with locking retention with said housing.

4. A fiber optic connector half for terminating and connecting a fiber optic cable, said cable having a central fiber optic core covered by insulation, said connector half comprising:

a ferrule having a bore proportioned to receive the stripped end of said cable with the fiber optic core end exposed, said ferrule having outer walls that are parallel to the axis of said bore, said ferrule being of molded, non-metallic construction and connected at one end to a tubular metal sleeve for receiving a length of optic cable spaced from the stripped cable end, whereby the stripped cable end may project to the end of the ferrule opposed to the end to be cleaved and polished at said opposed end for connection in abutting relation with another fiber optic core end and ferrule of similar design, and a flexible locking member positioned on said tubular sleeve, and said tubular sleeve carrying a locking flange whereby the flexible locking member inwardly abuts said locking flange, said locking member comprising a pair of flexible arms for removable engagement with a housing portion in which said connector half resides, a flange carried on said tubular sleeve adjacent the attached ferrule, and resilient means positioned on said tubular sleeve between said flange and the locking member to resiliently resist relative rearward movement of said tubular sleeve relative to said locking member.

5. The fiber optic connector half of claim 4 which comprises an outer sleeve defining a tubular posititition for snug contact with said ferrule outer walls to provide precise transverse positioning for said ferrule relative to said outer sleeve.

* * * * *